United States Patent

Lobo et al.

[11] Patent Number: 5,885,676
[45] Date of Patent: Mar. 23, 1999

[54] PLASTIC TUBE AND METHOD AND APPARATUS FOR MANUFACTURING

[75] Inventors: Edward M. Lobo, Shelton; Raymond H. Vanwagener, Darien, both of Conn.

[73] Assignee: Magnetek, Inc., Los Angeles, Calif.

[21] Appl. No.: 498,643

[22] Filed: Jul. 6, 1995

[51] Int. Cl.$^6$ .................................................. B65D 85/86
[52] U.S. Cl. ...................... 428/36.9; 428/35.2; 428/35.5; 428/124; 428/129; 428/138; 428/192; 428/906; 222/92; 222/107; 206/701; 206/719; 206/722
[58] Field of Search .................. 428/35.2, 35.5, 428/36.9, 36.92, 121, 130, 192, 906, 34.2, 124, 129, 138; 222/107, 92; 206/701, 719, 721, 722, 723, 724

[56] References Cited

U.S. PATENT DOCUMENTS

| | | |
|---|---|---|
| 2,003,326 | 6/1935 | Wellman ................................. 428/34.2 |
| 4,060,179 | 11/1977 | McGhic ..................................... 222/92 |
| 4,580,702 | 4/1986 | Hatakeyama et al. ................... 222/107 |
| 4,621,763 | 11/1986 | Brauner ..................................... 229/5.5 |

*Primary Examiner*—Rena L. Dye
*Attorney, Agent, or Firm*—Darby & Darby

[57] ABSTRACT

A plastic tube and a method and apparatus for forming it in which a strip of relatively thin plastic sheet material is cut from a roll of the material and wound around a mandrel. Overlapping ends of the strip are sealed to form the tube. The edge of the strip is inwardly bent to form an inwardly extending lip. When used in the manufacture of a capacitor, the tube is placed in a can on top of the disc of insulating material and a capacitor roll is placed in the tube. The edge of the sheet material can be pre-creased so that when folded inwardly, darts of the material form the lip.

10 Claims, 2 Drawing Sheets

PLASTIC TUBE AND METHOD AND APPARATUS FOR MANUFACTURING

BACKGROUND OF THE INVENTION

In the manufacture of electrical capacitors, layers of a metallic material separated by a layer of a dielectric material are wound in a roll. The capacitor roll is placed in a tube which is usually of paper, such as Kraft paper with a typical thickness of 0.015", and which is spiral wound. After the paper tube is formed, the periphery of one of its ends is bent inwardly to provide a mounting lip for the capacitor roll so it will not become displaced from the tube. The tube with the capacitor roll therein is placed within a metal outer housing, or can, with the lip end facing toward the bottom of the can. The capacitor is then impregnated with dielectric fluid and oil and the can is thereafter sealed.

While a spiral wound paper tube is satisfactory, it is relatively costly and inconvenient to use. For example, different size tubes may require different manufacturing procedures. Also, if a large quantity of tubes have to be stored, substantial space may be required. Further, due to the thickness of the spiral wound paper forming the tube, the inwardly bent lip is rather bulky and increases the vertical height of the tube. This extra height creates difficulty during automatic assembly.

BRIEF DESCRIPTION OF THE INVENTION

The present invention relates to a tube made of sheet plastic material having particular usefulness in the manufacture of capacitors and a method and apparatus for making the tube. The plastic tube is easier to make than a paper tube and can be made on an in-house machine and on demand.

The plastic material used in forming the tube of the invention is an elongated sheet and a roll of this sheet material is preferably used to provide continuous production of tubes. To form a tube, a strip of the plastic sheet material is rolled around a mandrel and cut from the roll. One edge of the strip overhangs the mandrel. The ends of the cut strip are overlapped and sealed together to form a closed body tube typically of cylindrical shape. The edge of the material overhanging the mandrel is folded or spun inwardly to form the inwardly extending lip for the bottom of the capacitor can. The folds forming the lip can be irregular in size and shape. Alternatively, the folds of the lip can be a continuous series of darts with overlapping layers of the sheet material forming the dart sealed to each other to create the tube lip.

The lip which is formed is relatively flat and the tube is of simple construction and is cost effective. The tube is inserted into a metal capacitor can with the lip preferably resting on a separate disc of insulating material at the bottom of the can. The capacitor roll is then placed into the tube/can/disc sub-assembly.

If desired, a piece of plastic material can be placed over and fastened to the tube lip. The fastening operations for the various parts of the tube are accomplished by, for example, ultrasonic welding, heat sealing or a suitable adhesive.

OBJECTS OF THE INVENTION

It is therefore an object of the invention to provide a tube of plastic material.

A further object is to provide a tube of plastic material with an inwardly extending lip at one end and a method and apparatus for forming such tubes on a continuous basis.

An additional object is to provide a novel method and apparatus for making a tube of plastic material suitable for holding a capacitor roll with one end of the tube having an inwardly extending lip formed by bending and folding an edge of the sheet material used in forming the tube.

Another object is to provide a tube of plastic material in which a strip of plastic having an edge on which a series of creases are formed is cut from a roll of such material, the ends of the strip are overlapped and attached to form a cylinder and the strip edge with the creases inwardly bent to form a series of overlapping darts which are fastened to the underlying sheet material to form a lip for the finished tube.

Yet another object is to provide a method and apparatus for making a capacitor including a tube of plastic material suitable for holding the capacitor roll of metal and dielectric material with one end of the tube having an inwardly extending lip with the tube being placed in an outer metal can.

BRIEF DESCRIPTION OF THE DRAWINGS

Other objects and advantages of the present invention will become more apparent upon reference to the following specification and annexed drawings in which.

DETAILED DESCRIPTION OF THE INVENTION

Figure 1:
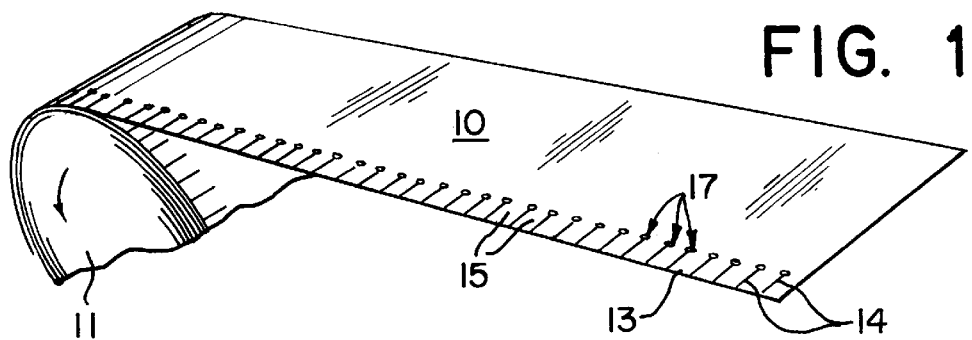
FIG. 1 is a perspective view of the material used for making the tube.

Referring to FIG. 1, the sheet plastic material 10 of which the tube is made is preferably located on a supply roll 11. The material can be, for example, polypropylene, polyethylene teraphthalate, or any other suitable plastic sheet material which has a relatively high dielectric constant and can be heat sealed or ultrasonic welded. Since the sheet material is thin and flexible, it also can be folded or creased. In a typical application, the material is polypropylene 0.006" thick. This has approximately the same dielectric effect as cardboard 0.015" thick while having only about half the thickness. Such material is relatively flexible, even when formed as a tube.

Along one edge 13 of the sheet 10, the material is preferably deformed with equally spaced upwardly facing creases 14 forming between two adjacent creases individual tabs 15 of the plastic material. The creases 14 are generally perpendicular to the sheet length direction and the tabs 15 are generally rectangular or are square. As the sheet material is fed for use from supply roll 11, the peaks of the creases point upwardly from the sheet top surface. A deformed area 17 can be formed on the sheet top surface to provide an easier fold for the creases at the start of a crease on the sheet.

The material 10 can be formed, for example, by taking a roll of the raw plastic sheet material and re-rolling it onto the supply roll 11 while passing it through a mechanism (not shown) between the two rolls which makes the creases 14. The creasing mechanism can be, for example, another roller having a plurality of blades which engage under pressure and deform, but do not cut through, an edge of the plastic sheet material 10 as it passes from the roll of raw material to the supply roll 11. The blades can be heated.

Figure 5A:
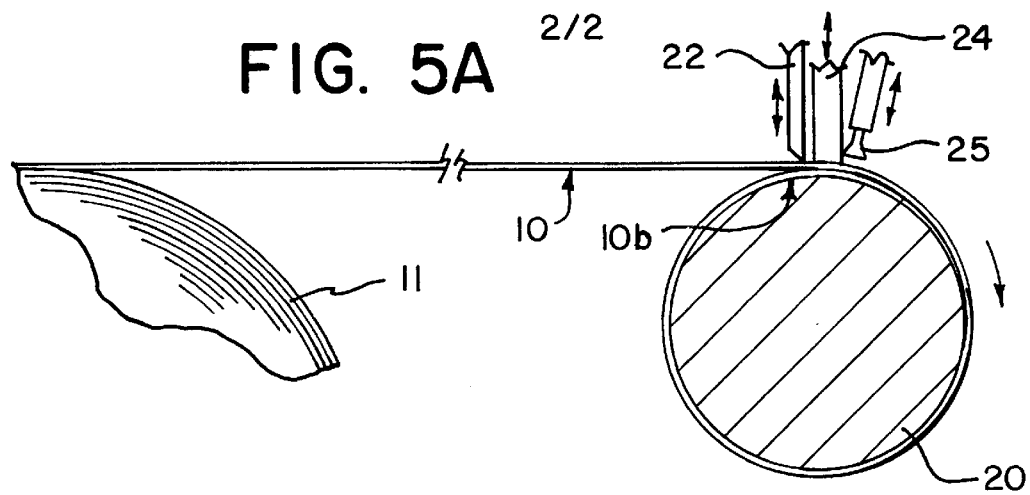
FIGS. 5A and 5B show in schematic form apparatus for making the tube.
Figure 5B:
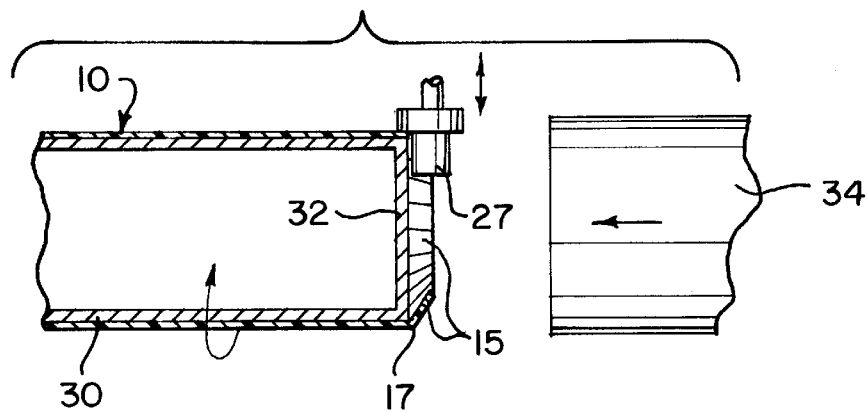

As shown in FIGS. 5A and 5B, the material 10 from the roll 11 is supplied to a winding arbor, or mandrel, 20 which has a shape and diameter corresponding to the desired shape and diameter of the tube to be formed. The material is taken from the supply roll 11 and wound around the mandrel with the peak of the creases 14 facing outwardly away from the mandrel. A strip of material of sufficient length is wound around arbor 20 as it rotates to form overlapping strip ends 10a and 10b. A clamp 24 is actuated to hold the rolled strip to the arbor. The sheet 10 is then cut at the end 10b of the strip by a knife blade 22 extending across the sheet's width. The tabs 15 and creases 14 along the strip edge 13 extend beyond the edge of the arbor. That is, the strip edge 13 does not lie on the surface of the arbor. The overlapping strip ends 10a and 10b are fastened together by a suitable device 25 which can be, for example, a heat sealer or an ultrasonic welder extending across the width of the strip.

While the arbor is shown as being of cylindrical shape, it should be understood that it can be of any desired shape, e.g., elliptical. That is, a non-cylindrical tube can be formed.

At this stage, the tube 29 is in a semi-finished state. It can be removed from the arbor 20 and thereafter placed on a rotating drum 30 having a solid end 32. A roller 27 is preferably provided at the end of the drum 30 over which the creased strip edge 13 extends. Roller 27 has a stepped inner and outer diameter to engage the strip edge 13 at or near where it joins the material 10 and inwardly bends edge 13 over the drum end toward its center axis. The roller 27 inwardly folds the strip edge 13 along a series of lines 18, each of which lies below a respective crease 14 into a series of overlapping, generally triangular darts 16 as shown in FIGS. 4A and 4B.

Each dart 16 has two layers of material of generally triangular shape. The lower layer has one leg on the bend line 18, the second the crease 14 and the third the outer edge of the sheet. The upper layer has one leg lying above the bend line, the second the crease 14 and the third the outer edge of the sheet.

The lower layer of each dart 16 lies above a part of the sheet material of the next adjacent tab portion 15 on which the bend line 18 was made. If desired, the original sheet material also can have inward deformations for the bend lines 18. This is usually not necessary since the material is quite thin and can be easily folded about line 18.

Figure 2:
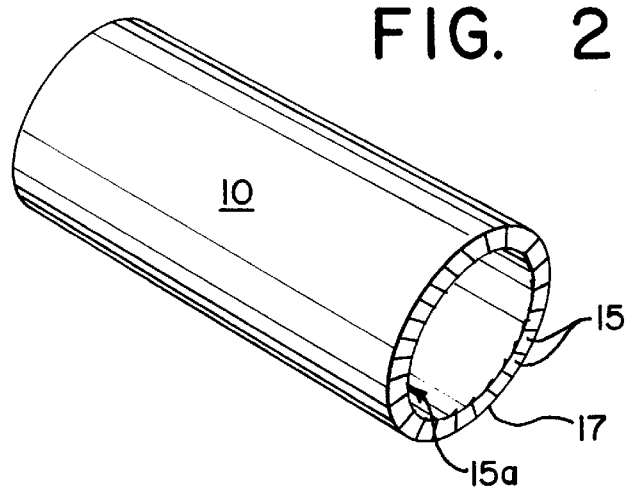
FIG. 2 is a perspective view of a finished tube.
Figure 3:
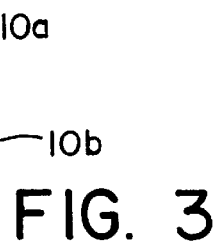
FIG. 3 is a cross-section of a finished tube along its length.
Figure 4A:
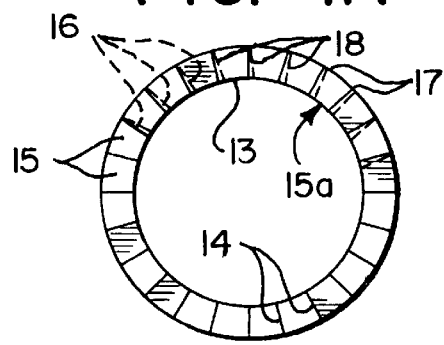
FIG. 4A is an end view of the tube lip.
Figure 4B:
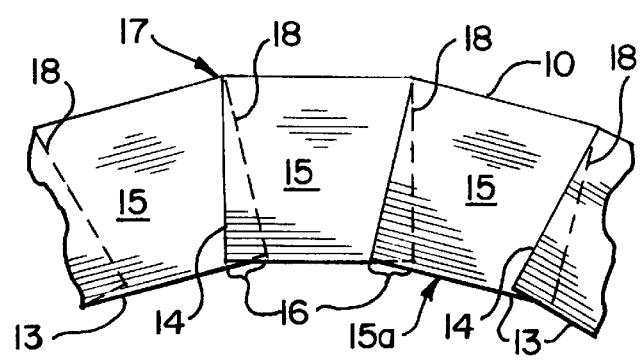
FIG. 4B is an enlarged view of a portion of the lip of a finished tube.

As seen in FIGS. 4A and 4B, the sheet edge 13 is now in the shape of inwardly bent overlapping darts 16. Another fastening device, such as a heat sealer or ultrasonic welder 34, is moved toward and engages and seals the overlapping layer of each dart to each other and to the underlying material of the next adjacent tab to form an inwardly extending lip 17 as seen in FIGS. 2 and 3. Thus, each sealed area has three layers of material. This increases the overall dielectric strength of the lip.

If desired, a portion of the heat sealer or ultrasonic welder fastening mechanism 34 can be located within the cylinder 30. The sealed overlapping darts form a lip 17 which is relatively stable. The lip 17 also is dielectrically sound since there are no cuts or holes which would cause dielectric leakage. The finished tube is then removed from the drum 30.

If desired, the complete operation of forming and sealing lip 17 can be carried out on the arbor 20 by making the arbor with a solid end over which the tabs 15 can be bent and the darts 16 sealed together. Here the roller 27 can be located adjacent the end of arbor 20 and the arbor rotated relative to the roller.

In another process for making the tube, the edge of the sheet material is not pre-creased along edge 13 to form the darts. In this process, the semi-finished tube 29 can be formed as described above. Here, while either on the arbor 20 the edge of the semi-finished tube 29 overhangs the arbor or else the semi-finished tube can be removed from the arbor and placed on the rotating drum 30 with the edge overhanging the drum solid end 32.

The roller 27 is used to fold the overhanging edge inwardly to form the lip 17. The folds are irregular. That is, the lip material is bunched, there are crinkles and folds of different shapes. Also, there is no regular pattern as would be expected when the uncreased overhanging edge of the cylindrical tube is folded inwardly. This can be tolerated when the tube with the capacitor roll therein is placed in the capacitor can. The weight of the capacitor roll and impregnant will somewhat flatten the irregular folds. The irregular folds resting on the disc on the can bottom will still provide adequate insulation between the capacitor roll and the can. If desired, the irregular folds forming the lip can be tacked together by heat sealing.

After the tube is formed with the lip, either with the dart or with irregular folds, due to the thinness of the wall material, the tube is flexible and can be bent or even folded if desired. The lip is also somewhat flexible.

During final assembly of the capacitor, a disc of cardboard or other similar material is placed on the bottom of the can (not shown) and the tube is inserted with the lip 17 facing the insulating disc. The rolled capacitor (not shown) is placed within the finished tube. The lip 17 of the tube with inserted capacitor rolls rests on the insulating disc (not shown). Thus, the end of the capacitor roll is fully insulated from the can bottom by the tube lip 17 and the disc at the bottom of the can and the roll insulated from the main part of the can by the plastic tube.

Figure 6:
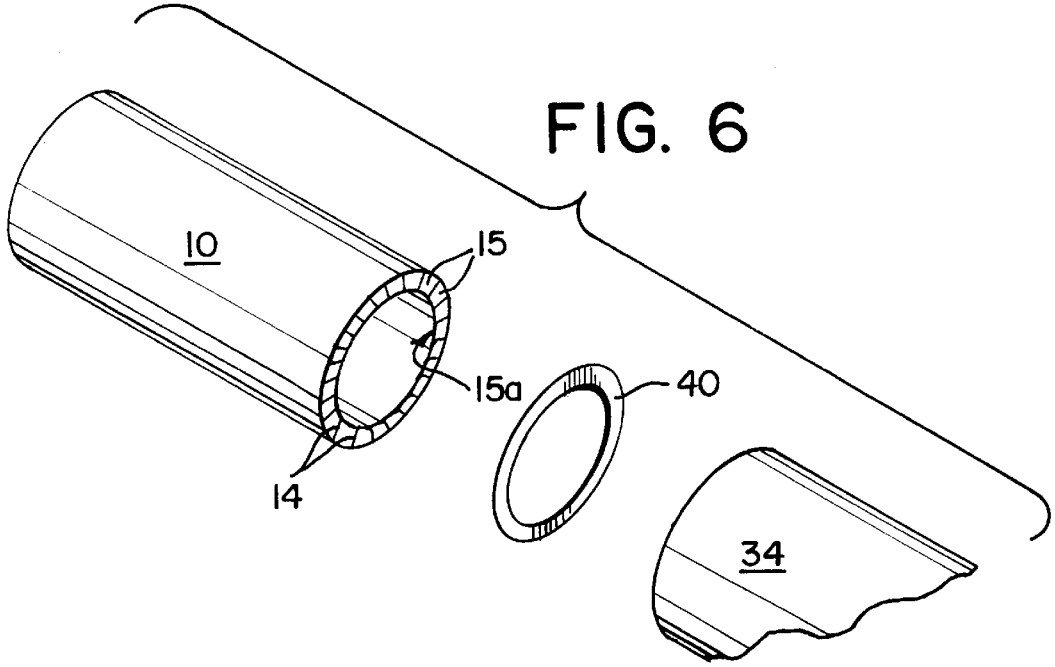
FIG. 6 shows a perspective view of a further embodiment of the invention in which an end piece is placed over the lip.

FIG. 6 shows another embodiment of the invention wherein an end piece 40 of the same material as the sheet 10, e.g., polypropylene, is provided. End piece 40, which can be fully circular or annular, or even square, has a diameter or size such as to overlie the inwardly bent sealed darts 16. Piece 40 is located over the darts 16 or the irregular folds and is fastened thereto, such as by heat sealing or ultrasonic welding. The finished tube with end piece 40 then can be inserted into the capacitor can which also may or may not have a disc of insulating material at its bottom.

The tube of the present invention has a number of advantages. As explained previously, it is thinner than a comparable tube of cardboard but yet has the same dielectric strength. The dielectric can be changed by varying the type of plastic material and/or its thickness.

The lip 17, even with the folded and sealed darts, or the irregular folds, lies relatively flat since the plastic sheet material is relatively thin. The lip 17 is stable and provides a good mounting for the capacitor roll. The heat sealing or ultrasonic welding of the tabs or folds does not add to the lip thickness. Even with a lip formed with irregular folds the thickness of such folds is usually not more than twice the thickness of the sheet material and the weight of the capacitor roll tends to flatten out the irregular folds. This reduces the overall length of the tube as compared to one of a spirally wound paper. This makes assembly of the capacitor easier.

The equipment for manufacturing the tube is relatively simple. The mandrel can be easily changed to produce various diameter tubes and different tube shapes. Also, there is good control of the tube diameter since it is wound over a mandrel or arbor. The width of the sheet and length of the mandrel can be changed to accommodate different tube lengths.

A tube made with the plastic material in accordance with the invention is less expensive than a comparable paper tube. The construction is simple. The tube can have uses other than for a capacitor as would be provided by tubes of comparable construction with an inwardly extending lip on one end.

We claim:

1. A plastic tube into which an object is to be inserted, said plastic tube comprising:

a strip of flat plastic sheet material having the ends thereof overlapped and attached to form a tube, one side edge of the strip having a series of crease lines therealong with a tab section between two adjacent crease lines and said one side edge folded at each said crease line to form a generally triangular shaped dart section for each said tab extending inwardly of the tube and overlying the respective tab to form an inwardly extending lip around the tube generally transverse to the tube longitudinal axis to prevent exit from the tube of the inserted object.

2. A plastic tube as in claim 1 wherein said darts are sealed to the tabs in the areas where overlying the tabs.

3. A plastic tube as in claim 1 further comprising a piece of plastic material sealed over the outside of said inwardly extending lip.

4. A plastic tube as in claim 3 wherein the piece of plastic material is a disc.

5. A plastic tube as in claim 3 wherein the piece of plastic material is square.

6. A plastic tube as in claim 1 wherein the strip sheet material is selected from the group consisting of polypropylene or polyethylene terephthalate.

7. A plastic tube as in claim 1 wherein the strip sheet material is of a heat sealable plastic and the overlying parts of the darts and tabs are heat sealed to provide an attachment.

8. A plastic tube as in claim 1 wherein a dart has two layers of the sheet material overlying the respective tab.

9. A plastic tube as in claim 1 further comprising a metallic can as the object inserted therein, the tube serving as an electric insulator.

10. A capacitor as in claim 1 further comprising a piece of electrically insulating material between the end of the tube having the lip and the part of the can opposing said lip.

* * * * *